(12) United States Patent
Kühlwein

(10) Patent No.: US 11,980,196 B2
(45) Date of Patent: May 14, 2024

(54) PREPARATION STATION FOR A FAST FOOD RESTAURANT

(71) Applicant: MKV GMBH, Salzburg-Aigen (AT)

(72) Inventor: Michael Kühlwein, Salzburg-Aigen (AT)

(73) Assignee: MKV GMBH, Salzburg-Aigen (AT)

( * ) Notice: Subject to any disclaimer, the term of this patent is extended or adjusted under 35 U.S.C. 154(b) by 0 days.

(21) Appl. No.: 18/069,297

(22) Filed: Dec. 21, 2022

(65) Prior Publication Data

US 2023/0127910 A1 Apr. 27, 2023

Related U.S. Application Data

(63) Continuation of application No. 16/628,461, filed as application No. PCT/EP2018/068000 on Jul. 13, 2017, now abandoned.

(30) Foreign Application Priority Data

Jul. 3, 2017 (DE) .................... 10 2017 114 805.1
Jan. 26, 2018 (DE) .................... 10 2018 101 809.6

(51) Int. Cl.
*A21C 15/00* (2006.01)
*A47B 33/00* (2006.01)
(Continued)

(52) U.S. Cl.
CPC ............ *A21C 15/002* (2013.01); *A47B 33/00* (2013.01); *B05C 17/0123* (2013.01); *G01F 11/029* (2013.01)

(58) Field of Classification Search
CPC ... A21C 15/002; A47B 33/00; B05C 17/0123; B05C 17/0103; G01F 11/029; G01F 11/22; A47J 45/02; A47J 47/01; A47G 19/183
See application file for complete search history.

(56) References Cited

U.S. PATENT DOCUMENTS 4,431,396 A * 2/1984 Lee .................... A21C 15/02
425/383
4,961,508 A 10/1990 Weimer et al.
(Continued)

FOREIGN PATENT DOCUMENTS

CA 2930097 A1 11/2017
EP 0479559 A1 4/1992
(Continued)

OTHER PUBLICATIONS

International Search Report, PCT/EP2018/068000, dated Dec. 19, 2018, 2 pages.
(Continued)

*Primary Examiner* — Bob Zadeh

(74) *Attorney, Agent, or Firm* — Stinson LLP

(57) ABSTRACT

A station for covering a bread roll half of a bread roll with a sauce in a preparation line of a fast food restaurant, comprising: a table by which a user standing at a front side can cover a bread roll half with sauce, a container comprising the sauce and arranged over the table at a working distance from the front side and from which an outlet nozzle oriented towards the table protrudes at a vertical distance from the table, so that the bread roll half which is to be covered with sauce can be placed on the table below the outlet nozzle, and a pressure actuator that can be actuated by the user and which is designed to dispense the sauce from the container onto the bread roll half when actuated by the user.

21 Claims, 10 Drawing Sheets

(51) Int. Cl.
  *B05C 17/01* (2006.01)
  *G01F 11/02* (2006.01)

(56) References Cited

U.S. PATENT DOCUMENTS

| | | | |
|---|---|---|---|
| 5,429,681 A | 7/1995 | Mesenbring | |
| 5,466,143 A | 11/1995 | Suzuki et al. | |
| 5,918,767 A * | 7/1999 | McGill | B67D 1/0001 222/105 |
| 6,170,391 B1 * | 1/2001 | Pomara, Jr. | A21C 9/063 99/450.2 |
| 9,420,802 B1 * | 8/2016 | Vera | A21C 11/00 |
| 2003/0132253 A1 | 7/2003 | Pantelleria et al. | |
| 2005/0247738 A1 * | 11/2005 | Klein | B05C 17/015 222/340 |
| 2006/0054641 A1 * | 3/2006 | Evers | B67D 1/0001 222/326 |
| 2012/0228334 A1 | 9/2012 | Van Wijk et al. | |
| 2016/0332788 A1 | 11/2016 | Chen | |
| 2021/0392906 A1 | 12/2021 | Kuhlwein | |
| 2023/0127910 A1 * | 4/2023 | Kühlwein | G01F 11/029 118/25 |

FOREIGN PATENT DOCUMENTS

| | | | |
|---|---|---|---|
| EP | 0554707 | * 8/1993 | |
| EP | 1952693 A1 * | 8/2008 | A21C 15/002 |
| FR | 2863826 A1 | 6/2005 | |
| GB | 392655 A | 5/1933 | |
| GB | 452514 A | 8/1936 | |
| GB | 2076473 A | 12/1981 | |

OTHER PUBLICATIONS

Written Opinion, PCT/EP2018/068000, dated Dec. 19, 2018, 6 pages.

* cited by examiner

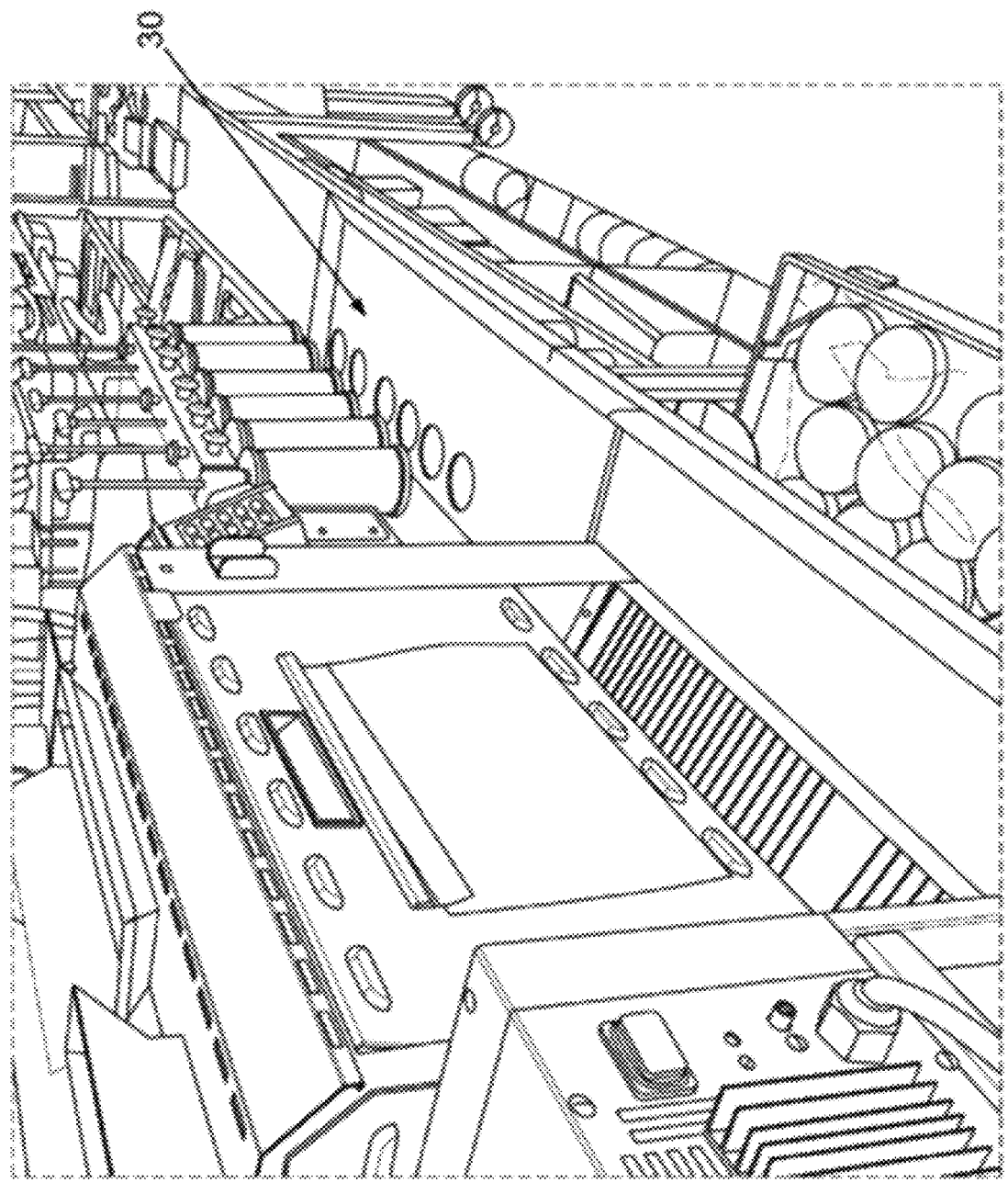

PREPARATION STATION FOR A FAST FOOD RESTAURANT

REFERENCE TO RELATED APPLICATIONS

This application is a continuation of U.S. patent application Ser. No. 16/628,461, filed Jan. 31, 2020, which is a U.S. national stage application based on PCT/EP2018/068000, filed Jul. 3, 2018, claiming priority to German application no. 10 2017 114 805.1, filed Jul. 3, 2017 and German application no. 10 2018 101 809.6, filed Jan. 26, 2018, the entire disclosures of which are incorporated herein by reference.

BRIEF DESCRIPTION OF THE INVENTION

The invention relates to a station for covering a bread roll half of a bread roll with a sauce in a preparation line of a fast food restaurant.

BACKGROUND OF THE INVENTION

Stations for covering a bread roll half of a bread roll with a sauce in a preparation line of a fast food restaurant are conventionally operated using purely manually actuable cartridge dispensing devices, such as are known from CA 2 930 097 A1, US 2012/0228334 A1 or US 2016/0332788 A1.

SUMMARY OF THE INVENTION

The object of the invention is to improve the known stations.

Briefly, therefore, the invention is directed to a station for covering a bread roll half of a bread roll with a sauce in a preparation line of a fast food restaurant, comprising: a table having an input side for receiving the bread roll half, an output side which is opposite the input side for outputting the bread roll half covered with sauce, a front side connecting the input side and the output side, it being possible for a user standing at said front side to cover the bread roll half with the sauce, and a rear side opposite the front side, a container comprising the sauce and arranged over the table at a working distance from the front side and from which an outlet nozzle oriented towards the table protrudes at a vertical distance from the table so that the bread roll half which is to be covered with sauce can be placed on the table below the outlet nozzle, and a pressure actuator that can be actuated by the user and which is designed to dispense the sauce from the container onto the bread roll half when actuated by the user.

Preferred configurations and developments are described in the dependent claims.

BRIEF DESCRIPTION OF THE DRAWINGS

FIG. 10 shows the station of FIGS. 7 to 9 in a preparation line of a fast food restaurant.

In the drawings, like technical elements are provided with like reference numerals and are only described once. The drawings are purely schematic and in particular do not reproduce the actual geometric relationships.

DETAILED DESCRIPTION OF PREFERRED EMBODIMENTS

Figure 1:
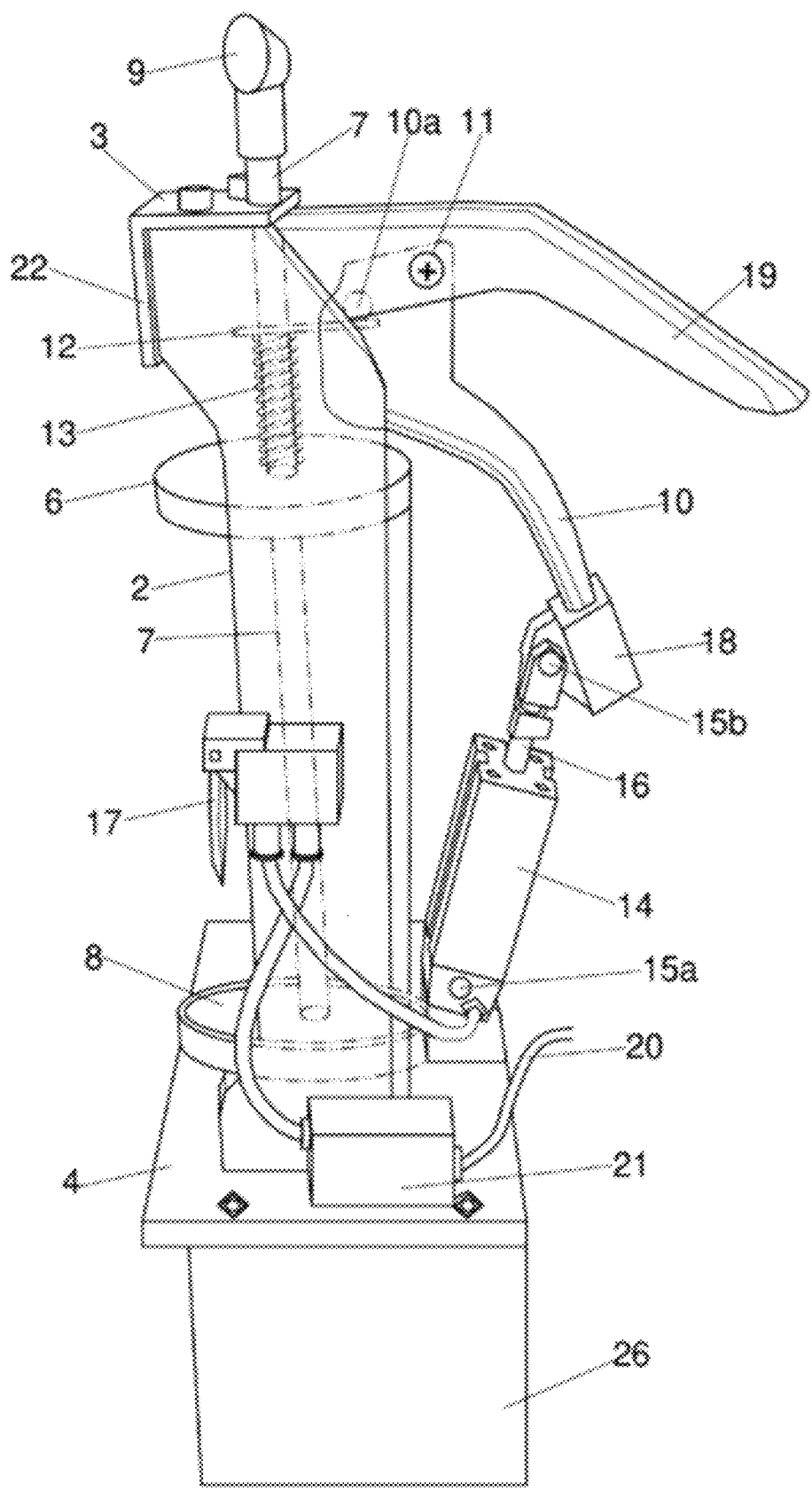
FIG. 1 is a side view of the sauce dispenser according to the invention.
Figure 2:
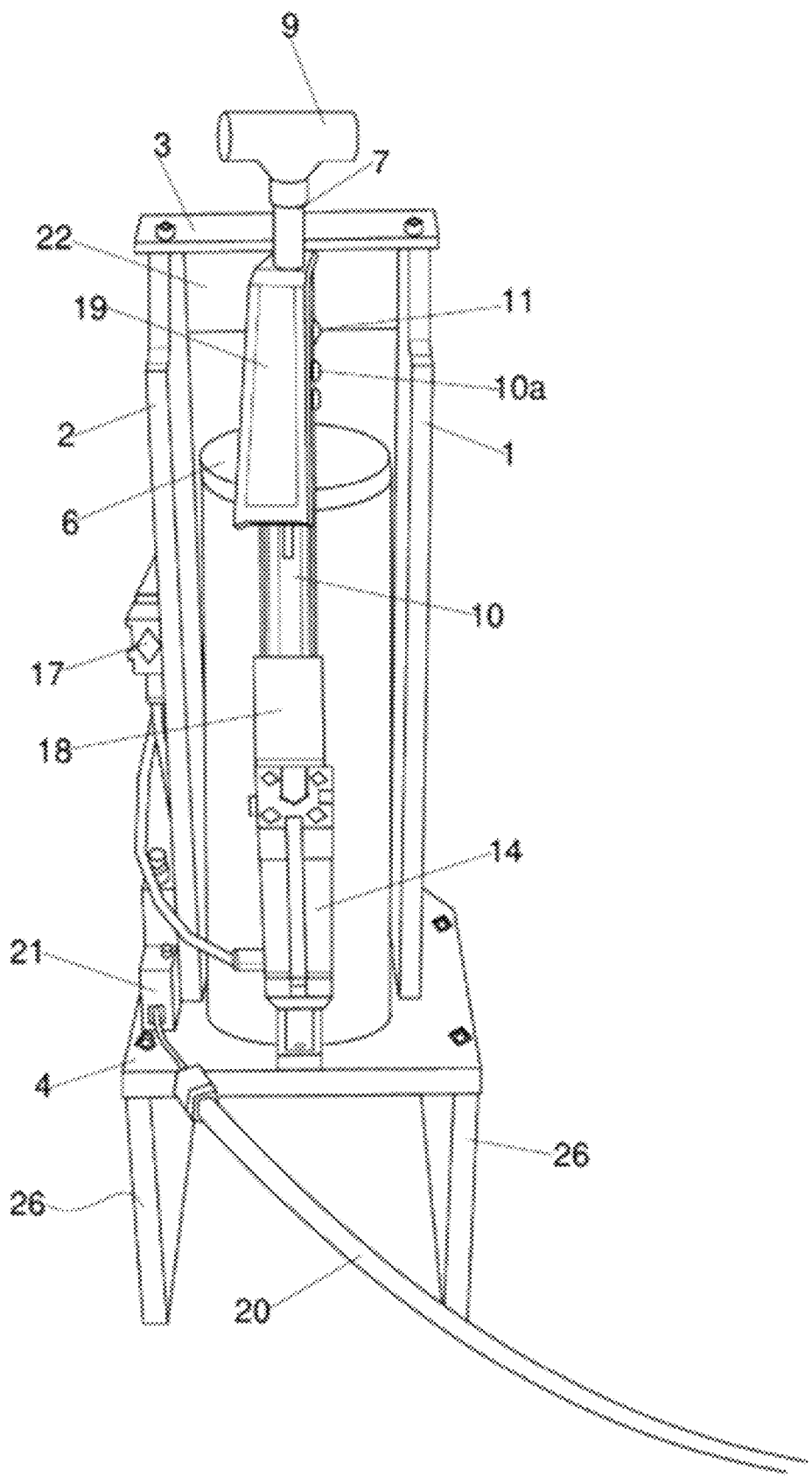
FIG. 2 is a view of the rear side of the sauce dispenser of FIG. 1.
Figure 3:
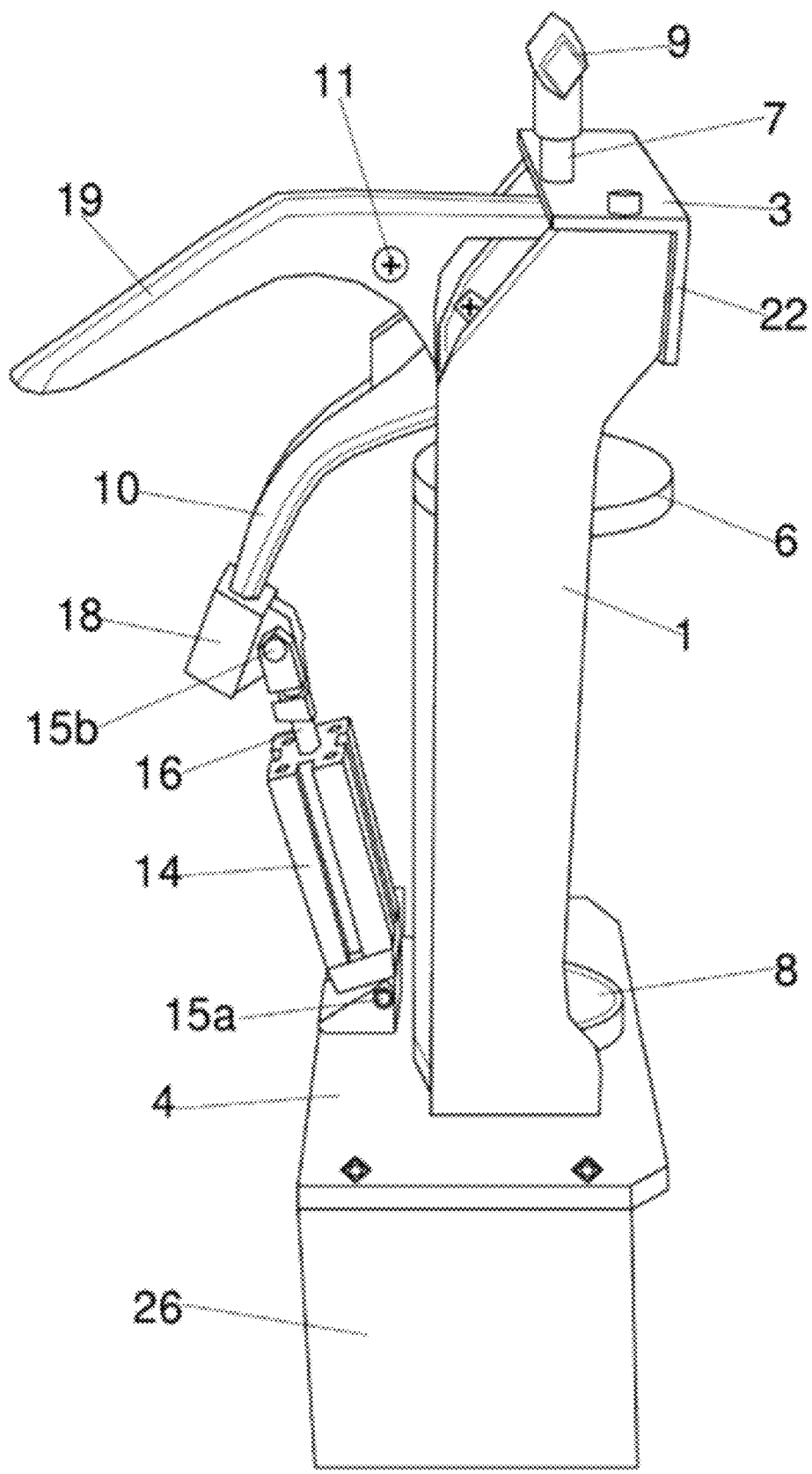
FIG. 3 is a side view rotated through 180° of the sauce dispenser of FIG. 1.

In one aspect of the invention, a station for covering a bread roll half of a bread roll with a sauce in a preparation line of a fast food restaurant comprises a table having an input side for receiving the bread roll half, an output side which is opposite the input side for outputting the bread roll half covered with sauce, a front side connecting the input side and the output side, it being possible for a user standing at said front side to cover the bread roll half with the sauce, and a rear side opposite the front side, a container comprising the sauce and arranged over the table at a working distance from the front side and from which an outlet nozzle oriented towards the table protrudes at a vertical distance from the table so that the bread roll half which is to be covered with sauce can be placed on the table below the outlet nozzle, and a pressure actuator that can be actuated by the user and which is designed to dispense the sauce from the container onto the bread roll half when actuated by the user.

The specified station is subject to the consideration that the manually actuable cartridge dispensing devices are comparatively resource-intensive. If, after use, the user places the cartridge dispensing device back in a container provided therefor, a large amount of residual sauce located on the output nozzle will always drip off as a result of the shaking. At several thousand uses per day, this results in a high sauce wastage.

For the specified station, it is proposed to mount the cartridge dispensing device rigidly. As a result of the rigid mounting, the cartridge dispensing device cannot be shaken, and this leads to much less residual sauce dripping off when the bread roll half is being covered.

In a development of the specified station, the container comprises a packet having a movable base that is inserted into a receiving space of a base body, a movable rod being guided from the outer face of the base body into the receiving space and a pivotable lever, mounted on the base body, being in engagement with the rod so as to push the rod in the direction of the receiving space as soon as the lever is pivoted with respect to the base body.

In a further development, the specified station comprises an actuator that connects the lever to the base body and that is set up to pivot the lever with respect to the base body.

In another further development of the specified station, the actuator is a pneumatic actuator.

In a preferred development of the specified station, the pneumatic actuator comprises a pneumatic cylinder having a cylinder body and a piston that is movable under pressure in the cylinder body and that has a piston rod.

In a particularly preferred development of the specified station, the pneumatic cylinder is connected in a stationary manner to the base body and the movable piston thereof is connected to the lever.

In another development, the station comprises an attachment that is removably attached to the lever and to which the actuator is pivotably connected.

In another further development of the specified station, the base body comprises a base plate having a lower face for placing the base body on and an upper face opposite the lower face, the receiving space being arranged adjacent to the upper face.

In an additional development of the specified station, the actuator is arranged pivotably on the base plate.

In a particular development of the specified station, the receiving space has a semicylindrical outer face in which a piston plate coupled to the rod is guided.

In a further development, the specified station has a handle fixed in a stationary manner to the base body, the lever being arranged pivotable towards the handle to push the rod in the direction of the receiving space.

In another further development, the specified station comprises at least one further container comprising a further sauce and arranged over the table at a working distance from the front side and from which a further outlet nozzle oriented towards the table protrudes at a further vertical distance from the table, and a further pressure actuator that can be actuated by the user and which is designed to dispense the sauce from the further container when actuated by the user.

In a preferred development of the specified station, the pressure actuator and the further pressure actuator can be actuated by way of a shared actuation member.

In a particularly preferred development of the specified station, the base body, the lever and the rod are part of a gun device that are insertable into the container.

In another further development of the specified station, the table comprises a clearance below the outlet nozzle.

In another aspect of the invention, a device comprises a base body having a receiving space for inserting a packet containing the foodstuff, a movable piston rod that is guided into the receiving space from the outside of the base body, and a pivotable lever that is mounted on the base body and in engagement with the piston rod for pushing the piston rod in the direction of the receiving space as soon as the lever is pivoted with respect to the base body, an actuator that connects the lever to the base body being provided and being arranged so that it pivots the lever with respect to the base body. As a result of the actuator, the user virtually no longer has to apply any force so as to dispense a foodstuff from the packet, and so the device can be used more easily, and above all also multiple times in succession, without the use thereof leading to muscle ache or excessive fatigue. High forces can also be applied using the lever so as to push the foodstuff out of the packet reliably. It is also advantageous that unappetizing residues of the foodstuff, which easily adhere to the output opening and soil an output connector, virtually do not occur, since the output always takes place vertically downwards and the packet also always remains in the vertically downwardly oriented position of the output opening thereof.

Preferably, the actuator is a pneumatic actuator. In this case, the pneumatic actuator has a pneumatic cylinder having a cylinder body and a piston that is movable pneumatically relative to the cylinder body.

In this context, the cylinder body is connected in a stationary manner to the base body of the device and the movable piston is connected to the lever. Thus, only the comparatively small piston has to be moved, while the cylinder body having the larger mass remains stationary. The mass to be moved, which is thus lower, is also noticeable by way of a lower power consumption.

Also preferably, the actuator may be an electric drive, such as an electric motor having a spindle drive or an electromagnet having a piston rod. In this context, it should be ensured that after each stroke of the piston rod the drive returns to a predefined starting position, it being possible for this to take place by spring force in the case of the electromagnet having a piston rod, and either by reversal of the direction of rotation of the electric motor or by decoupling of the spindle drives from the electric motor in the case of the electromagnet having a spindle drive.

Preferably, the device comprises an end piece that is releasably attached to the lever and on which the actuator is pivotably held. As a result, the actuator can be removed from the lever in a simple manner, making it possible, without any major steps, to retrofit the device so that it can also be used with pure manual operation.

Preferably, the base body comprises a base plate having a lower face for placing the base body on and an upper face opposite the lower face, the receiving space for inserting the packet being arranged adjacent to the upper face. Using the base plate, the device can easily be fixed to the underlying surface, such as a table. Preferably, in this context, the base plate is held at a distance from the upper face of the table so that output of the foodstuff can take place vertically downwards.

The actuator is arranged pivotably on the base plate. A tubular receiving space is formed in the base body and opens towards an outer face in a radial direction that differs from a radial direction in which the lever extends.

Preferably, the device comprises a support handle fixed in a stationary manner on the base body, the lever being arranged pivotable towards the support handle for pushing the rod in the direction of the receiving space.

Normally, the lever is directed in the same direction in which the user inserts the packet into the receiving space and withdraws the dispensed sauce from the packet. In the device according to the invention, however, the lever is directed in the other direction. In this way, the user has more space in front of the specified device. Equally, in emergency operation, purely manual operation using the lever is also possible from the rear side.

Preferably, a plurality of devices of the aforementioned type is arranged in a row in a shared housing. Thus, a plurality of different foodstuffs, such as ketchup, hot mustard, mild mustard, mayonnaise, sauce, dressing or other condiments, can be offered to customers at one station.

Reference is made to FIGS. 1 to 4, which are four side views of a device for covering a bread roll half of a bread roll with a sauce. The device has a base body having two parallel side walls 1 and 2, a cover wall 3 and a base plate 4, which enclose a receiving space 5. A packet (not shown) comprising a paste-like foodstuff, such as a sauce, can be inserted into the receiving space 5. The receiving space 5 is adapted to the shape of the packet and provided with a circular lid 6. A rod 7, which carries a piston plate 8 at the end thereof in the receiving space 5, protrudes through the lid. The other end of the rod 7 protrudes through the cover wall 3 and ends with a handle 9, which may be colored to identify the paste-like foodstuff. The rod 7 and the piston plate 8 fixed thereto are guided, linearly displaceably in the longitudinal direction, in an opening in the lid 6 and in a further opening in the cover wall 3.

Further, the rod 7 is coupled to a pivotable lever 10, the lever 10 being held directly or indirectly on the two side walls 1 and 2 via a pivot joint 11. A drive pin 10*a* on the lever 10 is coupled to a drive plate 12, which is biased by a spring 13 and which encloses the rod 7. During the upward movement of the lever 10, the drive plate 12 tilts with respect to the rod 7 and thus pushes the rod 7 downwards, whereas during the downward movement of the lever 10, the drive plate 12 is brought by the spring 13 into a tilt-free position in which it slides along the rod 7 without moving the rod 7. In this way, by repeated movement of the lever 10 in both directions, the rod 7 is incrementally pushed downwards, causing the piston plate 8 to be pushed onto a movable base of the packet and making it possible to dispense a predetermined amount of the paste-like foodstuff from the packet on each stroke.

The lever 10 is moved in the upward movement direction and in the downward movement direction by way of an actuator implemented as a pneumatic cylinder 14, of which one end is connected to the base plate 4 and the other end is connected to the lever 10, an articulated connection to joints 15a and 15b respectively being provided at the two ends.

In the embodiment shown in FIGS. 1 to 4, the pneumatic cylinder 14 is connected to the base plate 4 via a joint 15a and has a displaceable piston rod 16 which is articulated to the free end of the lever 10. The pneumatic cylinder 14 can be activated by way of a pneumatic switch 17, which is attached to one of the side walls 1 or 2 or an end wall, specifically preferably so that it faces the withdrawal side of the device shown at which a user uses the device for covering the bread roll half of the bread roll with the sauce. By pushing the switch 17 towards the packet, a pneumatic line 20 is opened and compressed air is thus applied to the pneumatic cylinder 14. Thereupon, the pneumatic cylinder actuates the lever 10, which in turn pushes the piston rod 16 downwards, in such a way that the paste-like foodstuff is pushed out of the packet. If the switch 17 is released, the pneumatic cylinder 14 is pressure-free again, and the piston rod 16 is slid in the direction of the interior of the pneumatic cylinder 14 by a restoring spring (not shown in greater detail), so that the lever 10 is displaced back into the starting position thereof again, but without moving the rod 7. With each actuation of the switch 17, the pneumatic cylinder 14 thus performs the aforementioned stroke, a predetermined amount of the paste-like foodstuff thus being pushed out of the packet.

The piston rod 16 is connected to a free end of the lever 10 via an attachment 18. In this context, the piston rod 16 is thus linked to the attachment 18 via a pivot joint 15b. Since the lever 10 is fixed in the upper region of the housing via the pivot joint 11 and inclined substantially obliquely downwards in the direction towards the base plate 4, the attachment 18 can simply be placed on the free end of the lever 10 and held in a frictional fit, since only minimal longitudinal forces occur in the direction of the longitudinal axis of the lever 10 when the piston rod 16 moves. Thus, if the pneumatics fail, the attachment 18 can be removed from the free end of the lever 10 without difficulty, so that the lever 10 can be actuated by hand. For this purpose, a stationary support handle 19, on which a hand can rest when the lever 10 is actuated, is fixed on the housing.

Compressed air is supplied to the pneumatic cylinder 14 via the aforementioned pneumatic line 20 and an upstream valve 21, which are connected to a compressed air source (not shown).

In the embodiments described thus far, the actuator is a pneumatic cylinder that has a piston rod and that is pneumatically operated using air pressure. Alternatively, an electromagnetic actuator may also be used, which actuates the piston rod 16 analogously, in which case it should still be provided that the piston rod 16 travels out when the switch 17 is being actuated and automatically travels back into the starting position thereof, for example under spring force, when the switch 17 is not being actuated.

Figure 4:
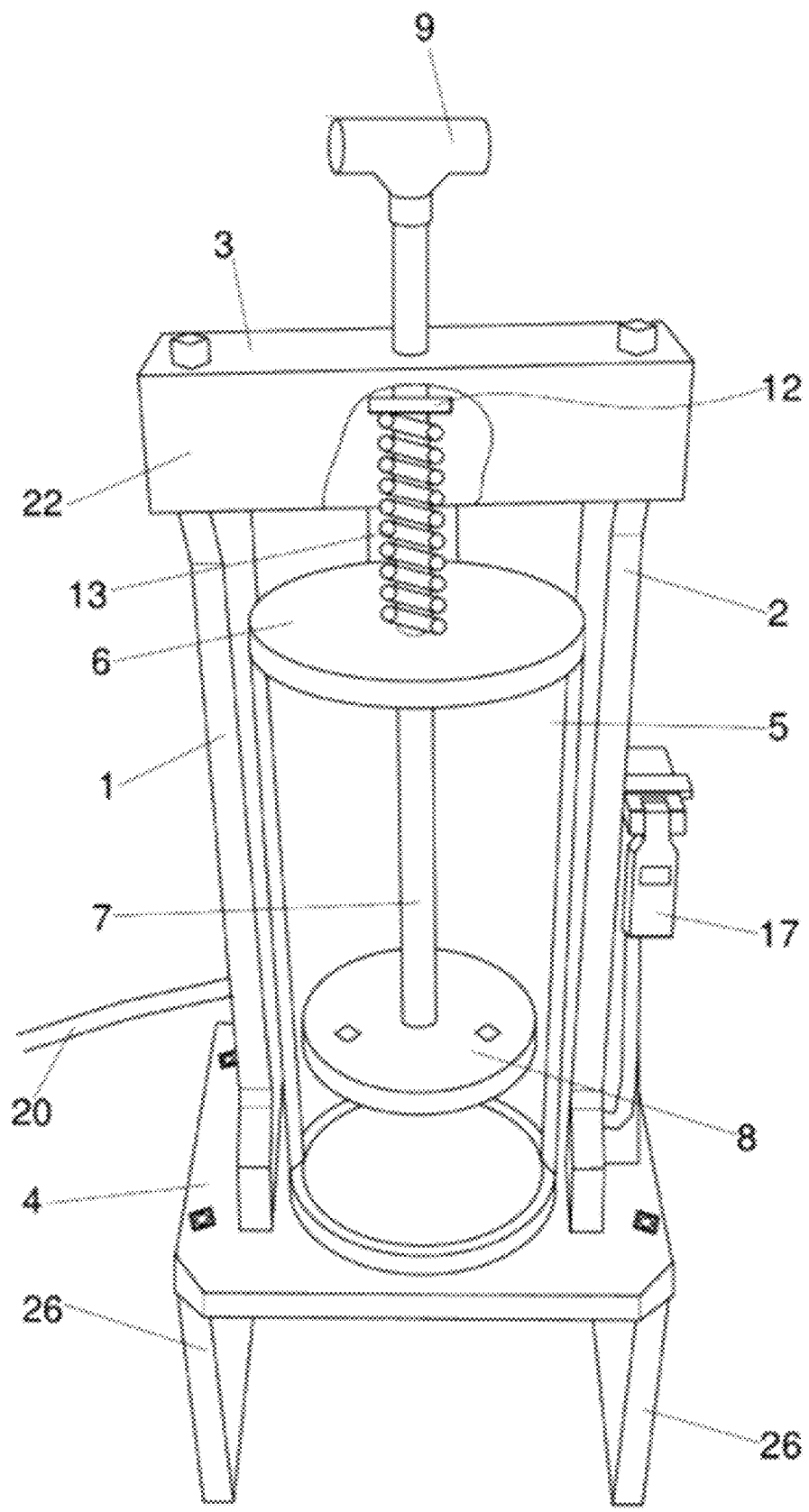
FIG. 4 is a side view rotated through 180° of the sauce dispenser of FIG. 2.

As can be seen most clearly from FIG. 4, the base plate 4 is in a raised position with respect to an underlying surface, such as a table, so that the sauce can be outputted vertically downwards under the base plate 4. This raised position is ensured by two parallel supporting walls 26 in this case. It can also be provided by feet (not shown) or in some other way.

Figure 5:
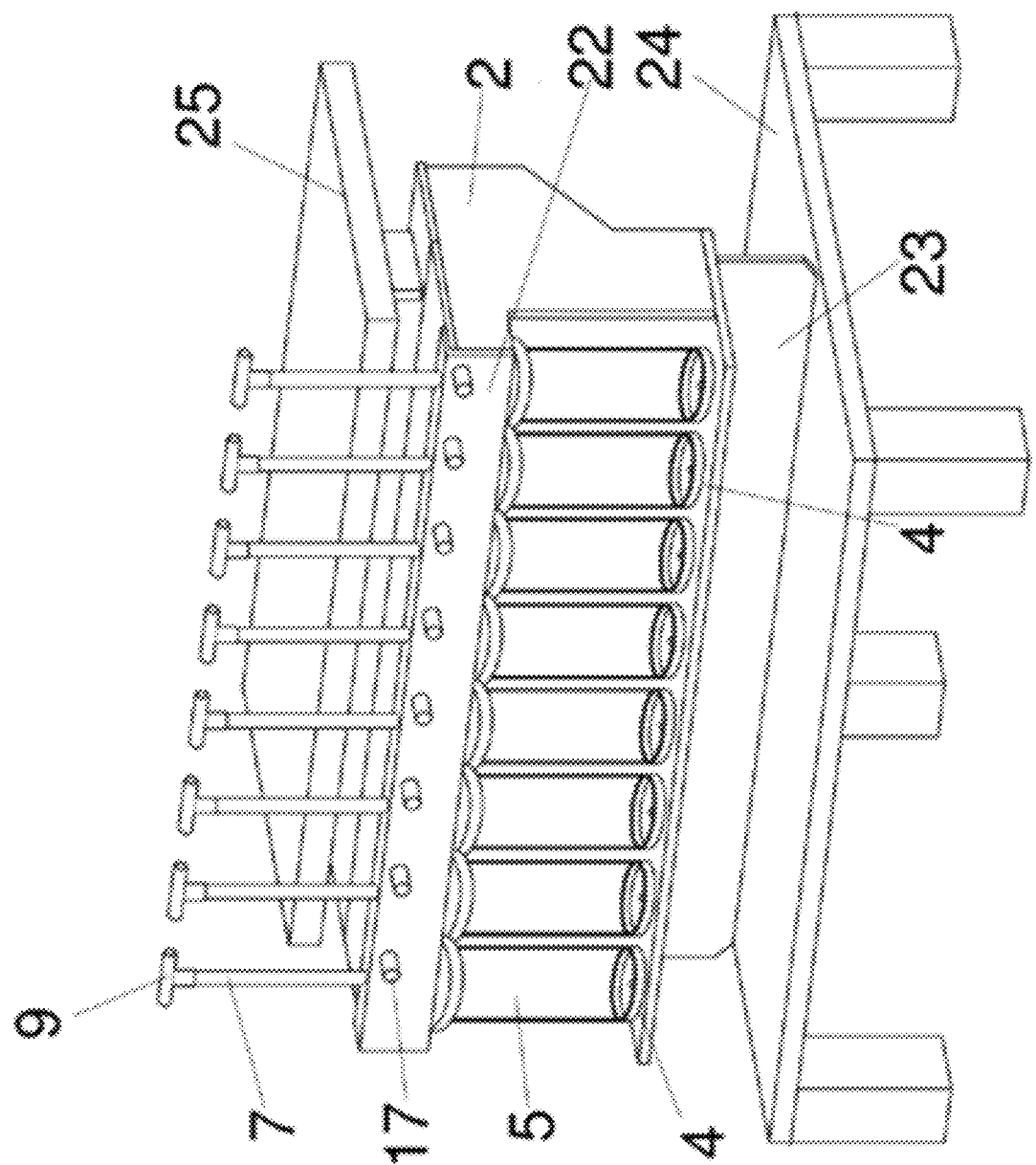
FIG. 5 is a schematic view of an arrangement of a plurality of sauce dispensers according to the invention.

FIG. 5 schematically shows an arrangement of a plurality of devices of the described type, which are accommodated in a row in a shared housing. In this specific case, there are eight receiving spaces, the rods 7 being depicted in this drawing with the handles 9 in their extended upper position, in which a packet can be inserted into the receiving space in each case. At the position of each of rods 7, the fill level of the associated packet can also immediately be discerned from the outside. A switch 17 is provided for actuating each individual sub-device. In this case too, the output takes place downwards, so that the base plate 4 is held at a distance from a table 24, in this case by a supporting wall 23.

Figure 6:
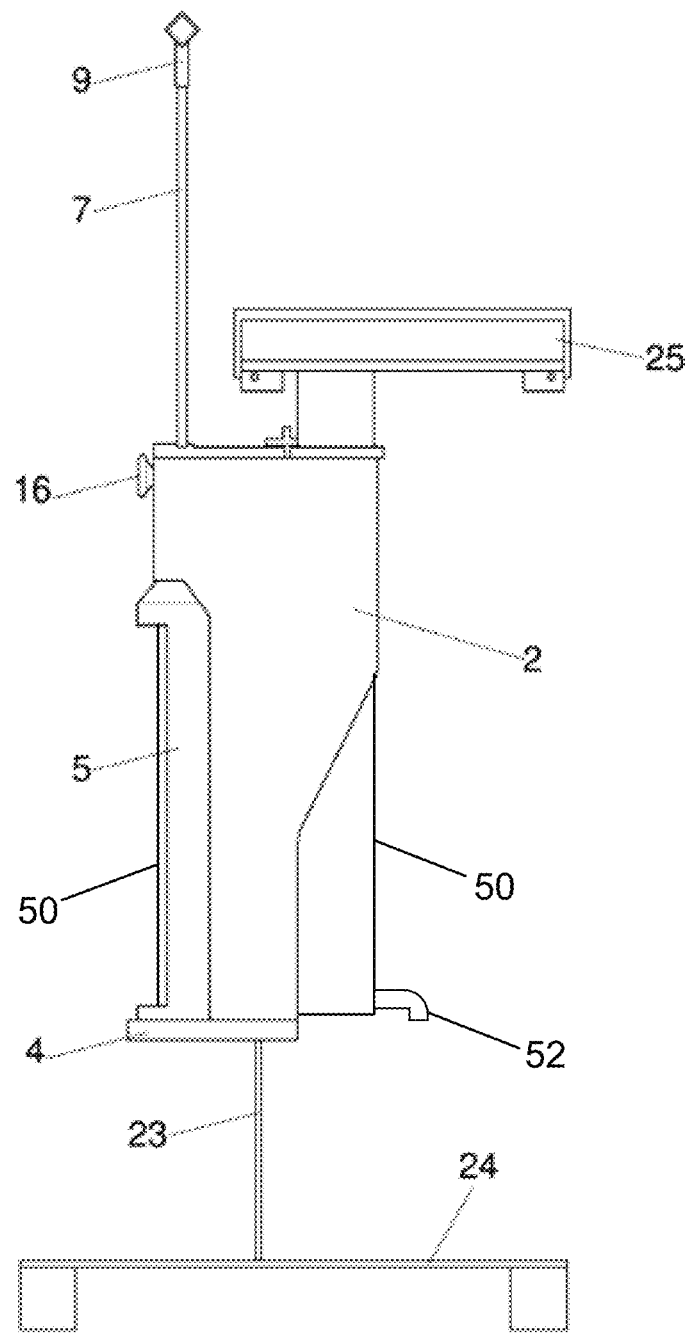
FIG. 6 is a view of the sauce dispensers of FIG. 5 seen from one side.

It can also further be seen from FIGS. 5 and 6 how a combined device can be arranged in a restaurant and integrated into a counter 25.

In the embodiment of FIG. 5, the receiving spaces 5 are open in part, so that the user can see the associated packets. Naturally, it is also possible to seal off the side facing the user with a plate (not shown). The contents of the individual packets can be identified by coloring and/or labeling the handles 9 or by labeling the narrow front wall 22 bearing the switch 16.

Figure 7:
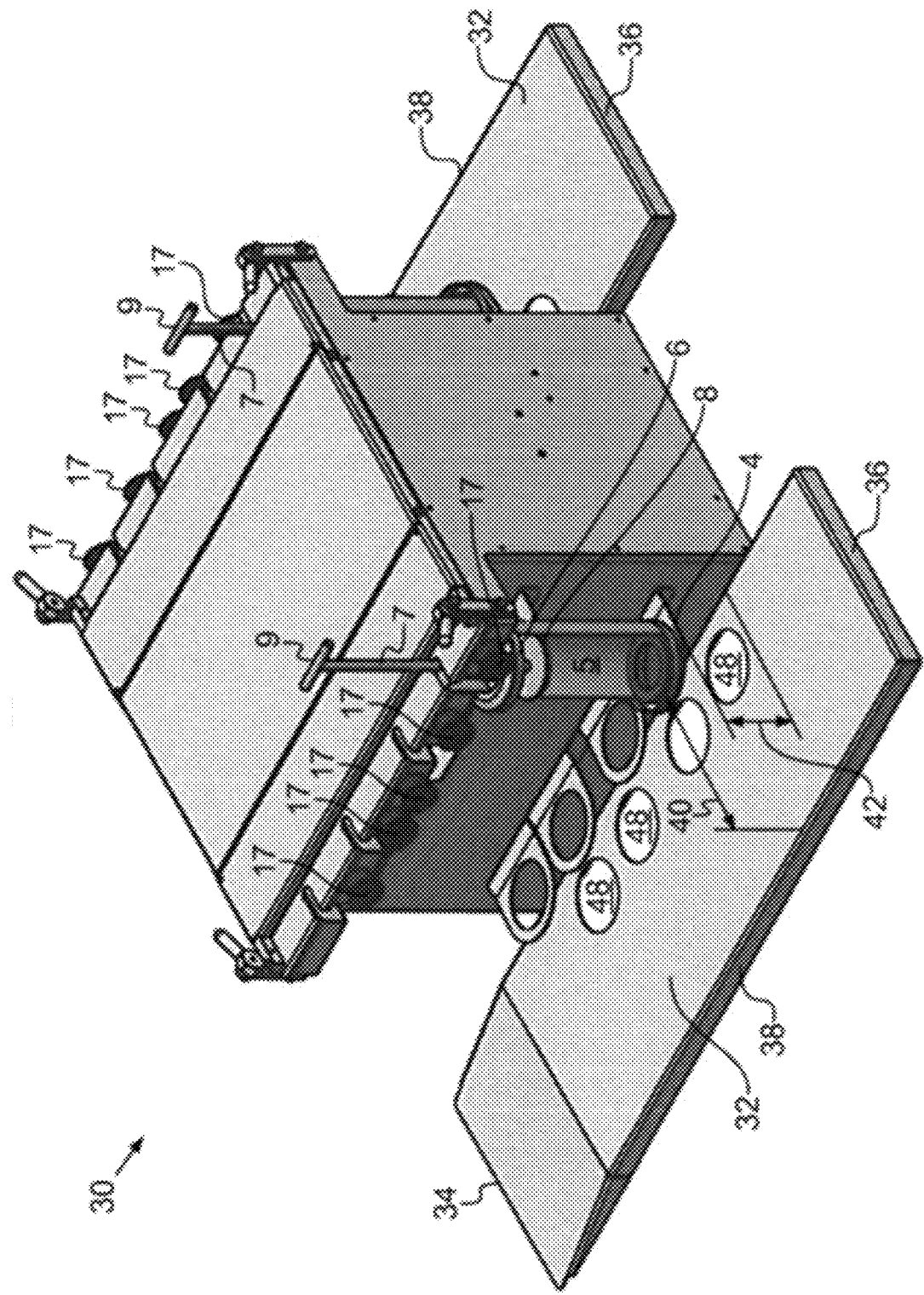
FIG. 7 is a perspective view of a station for covering a bread roll half of a bread roll with a sauce.
Figure 8:
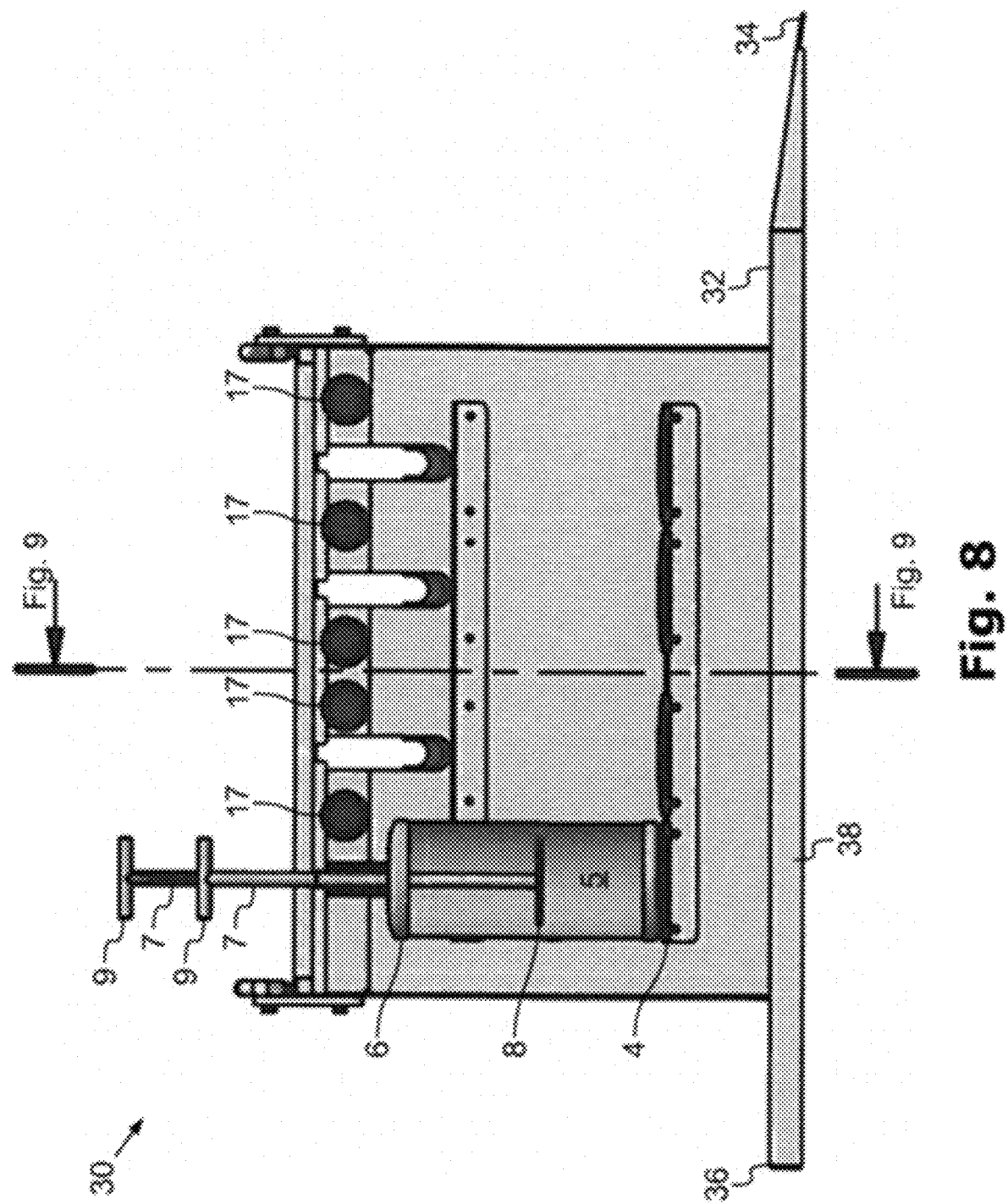
FIG. 8 is a front view of the station of FIG. 7.
Figure 9:
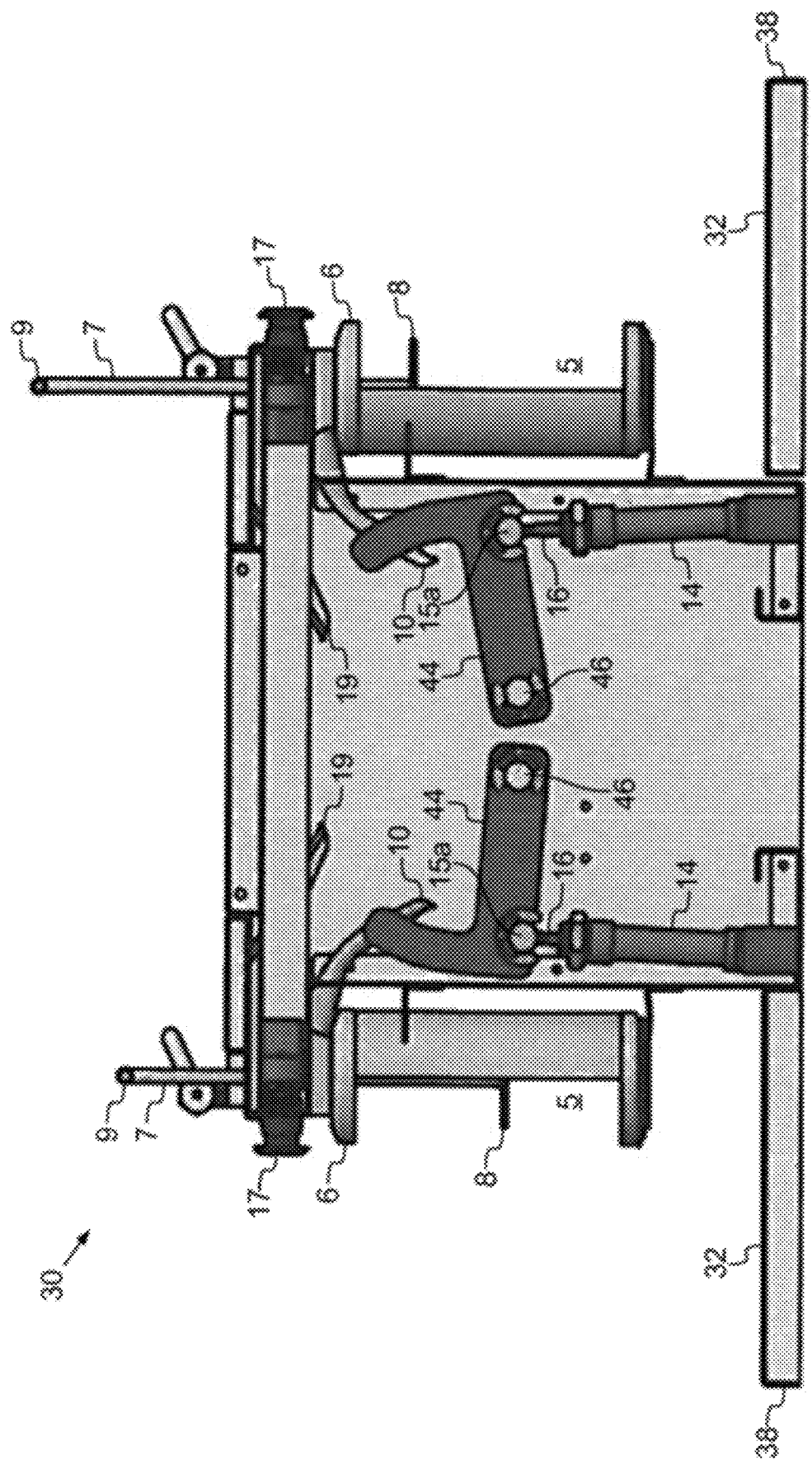
FIG. 9 is a sectional view of the station of FIGS. 7 and 8.

Reference is made to FIGS. 7 to 9, which show a station 30 for covering a bread roll half of a bread roll with a sauce in a preparation line of a fast food restaurant.

The station comprises a table 32 having an input side 34 for receiving the bread roll half, an output side 36 which is opposite the input side 34 for outputting the bread roll half covered with sauce, a front side 38 connecting the input side 34 and the output side 36, it being possible for a user standing at said front side to cover the bread roll half with the sauce, and a rear side 38 opposite the front side 38, against which an arrangement of a plurality of the above-described devices, for example according to FIG. 5, is positioned. As shown in FIG. 6, a container 50 comprising the sauce and arranged at a working distance 40 from the front face leads over the table 32, from which container 50 an outlet nozzle 52 directed towards the table 32 protrudes at a vertical distance 42 from the table 32, so that the bread roll half to be covered with the sauce can be placed on the table below the outlet nozzle 52. The container 50 comprising the outlet nozzle 52 is part of the aforementioned packet (not shown in greater detail).

The packet is inserted into a device as described above. Alternatively, the device may also be constructed as a manual cartridge dispensing device, also known as a gun device, such as is described for example in CA 2 930 097 A1 and US 2012/0228334 A1. In this case, the lever 10 of the device or cartridge dispensing device is moved via an intermediate lever 44, which is mounted rotatably at a lever point 46 and which is in turn driven by the piston rod 16 of the pressure cylinder 14 in the aforementioned manner.

Clearances 48, in which excess residual sauce can be captured if it drips off unintendedly during operation, are included in the table 32.

The invention claimed is:

1. A station for covering a bread roll half of a bread roll with a sauce in a preparation line of a fast food restaurant, comprising:
   a table having an input side for receiving the bread roll half, an output side which is opposite the input side for outputting the bread roll half covered with the sauce, a front side connecting the input side and the output side, and a rear side opposite the front side;
   a receiving space of a base body configured to receive a container comprising the sauce, and the base body arranged over the table at a working distance from the front side and from which an outlet nozzle of the container oriented towards the table protrudes at a vertical distance from the table when the container is received in the receiving space so that the bread roll half which is to be covered with the sauce can be placed on the table below the outlet nozzle of the container;
   a pressure actuator that can be actuated by the user and which is designed to dispense the sauce from the container onto the bread roll half when the container is received in the receiving space and actuated by the user, wherein the pressure actuator is at least one of a pneumatic actuator and an electric drive;
   a movable rod being guided from an outer face of the base body into the receiving space and a pivotable lever, mounted on the base body, being in engagement with the rod so as to push the rod in the direction of the receiving space as soon as the lever is pivoted with respect to the base body, wherein the movable rod is configured to push a movable base of the container that is inserted into the receiving space of the base body;
   at least one further receiving space of the base body each configured to receive a further container comprising a further sauce, and the base body arranged over the table at a further working distance from the front side and from which a further outlet nozzle of the further container oriented towards the table protrudes at a further vertical distance from the table when the further container is received in the further receiving space; and
   a further pressure actuator that can be actuated by the user and which is designed to dispense the sauce from the further container when the further container is received in the further receiving space and actuated by the user.

2. The station according to claim 1, wherein the receiving space has a semicylindrical outer face in which a piston plate coupled to the rod is guided.

3. The station according to claim 1, comprising a handle fixed in a stationary manner to the base body, the lever being arranged pivotable towards the handle to push the rod in a direction of the receiving space.

4. The station according to claim 1, wherein the pressure actuator and the further pressure actuator can be actuated by way of a shared actuation member.

5. The station according to claim 1, wherein the base body, the lever and the rod are part of a gun device that is insertable into the container when the container is received in the receiving space.

6. The station according to claim 1, wherein the pressure actuator connects the lever to the base body and is set up to pivot the lever with respect to the base body.

7. The station according to claim 6, comprising an attachment that is removably attached to the lever and to which the pressure actuator that connects the lever to the base body is pivotably connected.

8. The station according to claim 6:
   wherein the base body comprises a base plate having a lower face for placing the base body on and an upper face opposite the lower face, the receiving space being arranged adjacent to the upper face;
   wherein the pressure actuator is arranged pivotably on the base plate;
   wherein the receiving space has a semicylindrical outer face in which a piston plate coupled to the rod is guided;
   further comprising a handle fixed in a stationary manner to the base body, the lever being arranged pivotable towards the handle to push the rod in the direction of the receiving space;
   wherein the base body, the lever and the rod are part of a gun device that is insertable into the container when the container is received in the receiving space; and
   wherein the table comprises a clearance below the outlet nozzle of the container when the container is received in the receiving space.

9. The station according to claim 6:
   wherein the base body comprises a base plate having a lower face for placing the base body on and an upper face opposite the lower face, the receiving space being arranged adjacent to the upper face;
   further comprising a handle fixed in a stationary manner to the base body, the lever being arranged pivotable towards the handle to push the rod in the direction of the receiving space;
   further comprising at least one further receiving space of the base body each configured to receive a further container comprising a further sauce, and the base body arranged over the table at a further working distance from the front side and from which a further outlet nozzle of the further container oriented towards the table protrudes at a further vertical distance from the table when the further container is received in the further receiving space, and a further pressure actuator that can be actuated by the user and which is designed to dispense the sauce from the further container when the further container is received in the further receiving space and actuated by the user, wherein the pressure actuator and the further pressure actuator can be actuated by way of a shared actuation member; and
   wherein the base body, the lever and the rod are part of a gun device that is insertable into the container when the container is received in the receiving space.

10. The station according to claim 6:
    wherein the base body comprises a base plate having a lower face for placing the base body on and an upper face opposite the lower face, the receiving space being arranged adjacent to the upper face;
    wherein the pressure actuator is arranged pivotably on the base plate;
    wherein the receiving space has a semicylindrical outer face in which a piston plate coupled to the rod is guided;
    further comprising a handle fixed in a stationary manner to the base body, the lever being arranged pivotable towards the handle to push the rod in the direction of the receiving space;
    further comprising at least one further receiving space of the base body each configured to receive a further container comprising a further sauce, and the base body arranged over the table at a further working distance from the front side and from which a further outlet nozzle of the further container oriented towards the table protrudes at a further vertical distance from the table when the further container is received in the further receiving space, and a further pressure actuator that can be actuated by the user and which is designed to dispense the sauce from the further container when the further container is received in the further receiving space and actuated by the user, wherein the pressure actuator and the further pressure actuator can be actuated by way of a shared actuation member;

wherein the base body, the lever and the rod are part of a gun device that is insertable into the container when the container is received in the receiving space; and wherein the table comprises a clearance below the outlet nozzle of the container when the container is received in the receiving space.

11. The station according to claim 1, wherein the pneumatic actuator comprises a pneumatic cylinder having a cylinder body and a piston that is movable under pressure in the cylinder body and that has a piston rod.

12. The station according to claim 11, wherein the pneumatic cylinder is connected in a stationary manner to the base body and the movable piston thereof is connected to the lever.

13. The station according to claim 1, wherein the base body comprises a base plate having a lower face for placing the base body on and an upper face opposite the lower face, the receiving space being arranged adjacent to the upper face.

14. The station according to claim 13, wherein the pressure actuator is arranged pivotably on the base plate.

15. The station according to claim 1, wherein the table comprises a clearance below the outlet nozzle of the container when the container is received in the receiving space.

16. A station for covering a bread roll half of a bread roll with a sauce in a preparation line of a fast food restaurant, comprising:
a table having an input side for receiving the bread roll half, an output side which is opposite the input side for outputting the bread roll half covered with the sauce, a front side connecting the input side and the output side, and a rear side opposite the front side;
a receiving space of a base body configured to receive a container comprising the sauce, and the base body arranged over the table at a working distance from the front side and from which an outlet nozzle of the container oriented towards the table protrudes at a vertical distance from the table when the container is received in the receiving space so that the bread roll half which is to be covered with the sauce can be placed on the table below the outlet nozzle of the container;
a pressure actuator that can be actuated by the user and which is designed to dispense the sauce from the container onto the bread roll half when the container is received in the receiving space and actuated by the user, wherein the pressure actuator is at least one of a pneumatic actuator and an electric drive; and
a movable rod being guided from an outer face of the base body into the receiving space and a pivotable lever, mounted on the base body, being in engagement with the rod so as to push the rod in the direction of the receiving space as soon as the lever is pivoted with respect to the base body, wherein the movable rod is configured to push a movable base of the container that is inserted into the receiving space of the base body, wherein the pressure actuator connects the lever to the base body and is set up to pivot the lever with respect to the base body.

17. The station according to claim 16, comprising an attachment that is removably attached to the lever and to which the pressure actuator that connects the lever to the base body is pivotably connected.

18. The station according to claim 16:
wherein the base body comprises a base plate having a lower face for placing the base body on and an upper face opposite the lower face, the receiving space being arranged adjacent to the upper face;
wherein the pressure actuator is arranged pivotably on the base plate;
wherein the receiving space has a semicylindrical outer face in which a piston plate coupled to the rod is guided;
further comprising a handle fixed in a stationary manner to the base body, the lever being arranged pivotable towards the handle to push the rod in the direction of the receiving space;
wherein the base body, the lever and the rod are part of a gun device that is insertable into the container when the container is received in the receiving space; and
wherein the table comprises a clearance below the outlet nozzle of the container when the container is received in the receiving space.

19. The station according to claim 16:
wherein the base body comprises a base plate having a lower face for placing the base body on and an upper face opposite the lower face, the receiving space being arranged adjacent to the upper face;
further comprising a handle fixed in a stationary manner to the base body, the lever being arranged pivotable towards the handle to push the rod in the direction of the receiving space;
further comprising at least one further receiving space of the base body each configured to receive a further container comprising a further sauce, and the base body arranged over the table at a further working distance from the front side and from which a further outlet nozzle of the further container oriented towards the table protrudes at a further vertical distance from the table when the further container is received in the further receiving space, and a further pressure actuator that can be actuated by the user and which is designed to dispense the sauce from the further container when the further container is received in the further receiving space and actuated by the user, wherein the pressure actuator and the further pressure actuator can be actuated by way of a shared actuation member; and
wherein the base body, the lever and the rod are part of a gun device that is insertable into the container when the container is received in the receiving space.

20. The station according to claim 16:
wherein the base body comprises a base plate having a lower face for placing the base body on and an upper face opposite the lower face, the receiving space being arranged adjacent to the upper face;
wherein the pressure actuator is arranged pivotably on the base plate;
wherein the receiving space has a semicylindrical outer face in which a piston plate coupled to the rod is guided;
further comprising a handle fixed in a stationary manner to the base body, the lever being arranged pivotable towards the handle to push the rod in the direction of the receiving space;
further comprising at least one further receiving space of the base body each configured to receive a further container comprising a further sauce, and the base body arranged over the table at a further working distance from the front side and from which a further outlet nozzle of the further container oriented towards the table protrudes at a further vertical distance from the table when the further container is received in the further receiving space, and a further pressure actuator that can be actuated by the user and which is designed to dispense the sauce from the further container when the further container is received in the further receiving space and actuated by the user, wherein the pressure actuator and the further pressure actuator can be actuated by way of a shared actuation member;

wherein the base body, the lever and the rod are part of a gun device that is insertable into the container when the container is received in the receiving space; and wherein the table comprises a clearance below the outlet nozzle of the container when the container is received in the receiving space.

21. A station for covering a bread roll half of a bread roll with a sauce in a preparation line of a fast food restaurant, comprising:

a table having an input side for receiving the bread roll half, an output side which is opposite the input side for outputting the bread roll half covered with the sauce, a front side connecting the input side and the output side, and a rear side opposite the front side;

a receiving space of a base body configured to receive a container comprising the sauce, and the base body arranged over the table at a working distance from the front side and from which an outlet nozzle of the container oriented towards the table protrudes at a vertical distance from the table when the container is received in the receiving space so that the bread roll half which is to be covered with the sauce can be placed on the table below the outlet nozzle of the container;

a pressure actuator that can be actuated by the user and which is designed to dispense the sauce from the container onto the bread roll half when the container is received in the receiving space and actuated by the user, wherein the pressure actuator is at least one of a pneumatic actuator and an electric drive; and a movable rod being guided from an outer face of the base body into the receiving space and a pivotable lever, mounted on the base body, being in engagement with the rod so as to push the rod in the direction of the receiving space as soon as the lever is pivoted with respect to the base body, wherein the movable rod is configured to push a movable base of the container that is inserted into the receiving space of the base body, wherein the base body comprises a base plate having a lower face for placing the base body on and an upper face opposite the lower face, the receiving space being arranged adjacent to the upper face, and wherein the pressure actuator is arranged pivotably on the base plate.

* * * * *